United States Patent Office.

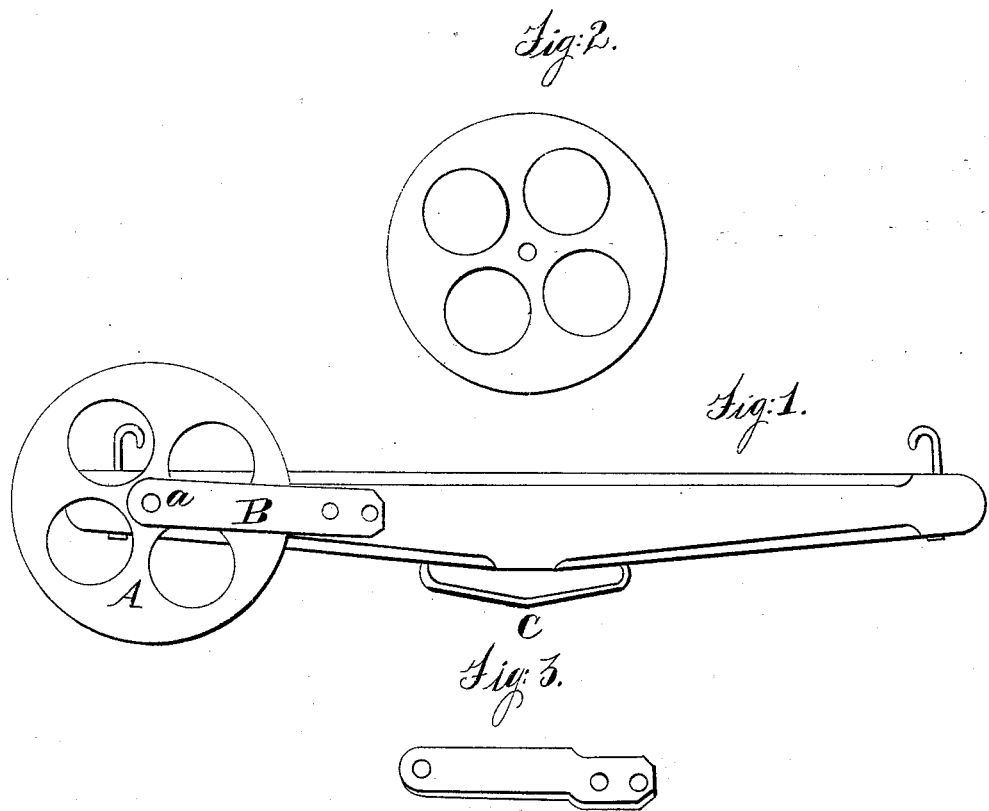

J. B. RIPSOM, OF KENDALL, NEW YORK.

*Letters Patent No. 61,260, dated January 15, 1867.*

---

IMPROVEMENT IN WHIFFLE-TREE ATTACHMENT TO PLOUGHS.

---

*The Schedule referred to in these Letters Patent and making part of the same.*

---

TO ALL WHOM IT MAY CONCERN:

Be it known that I, J. B. RIPSOM, of the town of Kendall, and county of Orleans, and State of New York, have invented certain new and useful improvements in Attachments to Plough Whiffle-Trees or Eveners, for ploughing in orchards; and I hereby declare that the following is a full and exact description thereof, reference being had to the accompanying drawings, making part of this specification.

Figure 1 is a whiffle-tree or evener with my improved attachments.

Figures 2 and 3 are views of parts detached.

Like letters of reference indicate corresponding parts in all the figures.

The design of my invention is to obviate the barking or marring of trees when coming in contact with them, by means of a wheel, marked A, with or without a rubber band, and secured to the upper or lower side of the whiffle-tree or evener, by means of an iron brace, B, which is fastened to the whiffle-tree by means of two bolts or screws, which serve as a support to the pivot $a$, upon which the wheel revolves, the wheel projecting beyond the end of the whiffle-tree to prevent its coming in contact with the tree. The whiffle-tree is also provided with a long staple, C, which allows it to slide when coming in contact with the tree, and as soon as the pressure is removed it regains its centre by means of the inclination of the staple from each end to the centre. It is obvious that the wheel A, in conjunction with the long staple C, the one revolving and the other allowing the whiffle-tree to slide to one side, will prevent the injury that would result from the whiffle-tree scraping the tree as ordinarily.

What I claim as my invention, and desire to secure by Letters Patent, is—

1. The application of the wheel A, projecting beyond the end of the whiffle-tree, as shown in fig. 1.
2. I also claim the brace B and pivot $a$, for the purpose of securing the wheel to the whiffle-tree, substantially as herein described.
3. In combination with the wheel A, I also claim the long staple C, for the purpose herein set forth.
4. I also claim the special arrangement and combination of the whole thing, as herein set forth.

In witness whereof I have hereunto signed my name in presence of two subscribing witnesses.

J. B. RIPSOM.

Witnesses:
PHILO F. PROSSER, Jr.,
JAMES K. GRISWOLD.